(12) United States Patent
Liu et al.

(10) Patent No.: US 11,587,595 B1
(45) Date of Patent: Feb. 21, 2023

(54) METHOD OF IDENTIFYING DAE-CONTEXT ISSUES THROUGH MULTI-DIMENSION INFORMATION CORRELATION

(71) Applicant: EMC IP Holding Company LLC, Hopkinton, MA (US)

(72) Inventors: Bing Liu, Tianjin (CN); Parmeshwr Prasad, Bangalore (IN); Parminder Singh Sethi, Punjab (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/451,212

(22) Filed: Oct. 18, 2021

(51) Int. Cl.
  *G06F 11/07* (2006.01)
  *G11B 33/10* (2006.01)
  *G06F 11/00* (2006.01)
  *G06F 11/30* (2006.01)

(52) U.S. Cl.
  CPC .......... *G11B 33/10* (2013.01); *G06F 11/008* (2013.01); *G06F 11/0727* (2013.01); *G06F 11/3034* (2013.01)

(58) Field of Classification Search
  CPC .............. G06F 11/0727; G06F 11/008; G06F 11/3466; G06F 11/2034; G06F 11/079; G06F 11/3034; H04L 41/0631
  See application file for complete search history.

(56) References Cited

U.S. PATENT DOCUMENTS

| | | | | |
|---|---|---|---|---|
| 2009/0300428 A1* | 12/2009 | Matsumoto | ........... | G06F 11/079 714/47.1 |
| 2011/0296237 A1* | 12/2011 | Mandagere | ........... | G06F 11/079 714/E11.029 |
| 2012/0102362 A1* | 4/2012 | Onitsuka | ............ | G06F 11/0727 714/E11.029 |
| 2013/0227589 A1* | 8/2013 | Mikami | .............. | G06F 11/0709 719/318 |
| 2016/0092292 A1* | 3/2016 | Lv | ........................ | G06F 11/0727 714/37 |
| 2017/0235629 A1* | 8/2017 | Go | ....................... | G06F 11/0751 714/57 |
| 2020/0133758 A1* | 4/2020 | Liu | ....................... | G06F 3/0689 |

* cited by examiner

*Primary Examiner* — Yolanda L Wilson
(74) *Attorney, Agent, or Firm* — Womble Bond Dickinson (US) LLP (57) ABSTRACT

In one embodiment, an exemplary method includes receiving multi-dimension information from a data domain operating system running on the server; determining that multiple drive failures occurred within a predetermined time frame based on the multi-dimension information; and extracting a list of system-level events and a timestamp of each event from the multi-dimension information. The method further includes determining a list of components impacted by the list of the system-level events based on the list of system-level events and the timestamp of each event; and determining one or more system-level events associated with one or more impacted components as root causes of the multiple drive failures based on the multi-dimension information. The method uses information from multiple regions of the DAE and correlate the information using a predetermined algorithm to automatically more efficiently identify one or more possible root causes of the multiple drive failures.

18 Claims, 6 Drawing Sheets

METHOD OF IDENTIFYING DAE-CONTEXT ISSUES THROUGH MULTI-DIMENSION INFORMATION CORRELATION

FIELD OF THE INVENTION

Embodiments of the present invention relate generally to data storage systems. More particularly, embodiments of the invention relate to identifying context issues of a data disk array enclosure (DAE) in a data domain storage system.

BACKGROUND

A data storage system, e.g., a data domain restorer (DDR), can include multiple disk array enclosures (DAEs). Each DAE can include multiple disk drives, and can tremendously impact the backend storage health in a production environment.

However, due to the complexity of the DAE, many factors may degrade the health of a DAE's drive, and eventually cause issues in the DAE, such as a failure in a disk of the drive. In this document, these issues caused to a DAE by these factors are referred to as DAE-context issues. Examples of these factors may include temperatures in the DAE, power instability, and abnormality caused by human operations.

When a disk failure occurs in multiple drives in a DAE, it can be complex to perform a triage procedure to identify a particular factor as the root cause of the disk failures due to the multiple contributing factors.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure relate to a method, system, medium for leveraging multi-dimension information to correlate multiple drive failures to intelligently deduce root cause for DAE-context issues. The information leveraged can include historical drive data collected by monitoring and scanning tools, storage topology information, and system-level events information. The embodiments described herein can be used as triage tool, and can facilitate the detection of root causes of disk failures, and provide information instructing engineers to eliminate the root causes causing the disk failures.

In one embodiment, an exemplary method includes receiving multi-dimension information from a data domain operating system running on the server; determining that multiple drive failures occurred within a predetermined time frame based on the multi-dimension information; and extracting a list of system-level events and a timestamp of each event from the multi-dimension information. The method further includes determining a list of components impacted by the list of the system-level events based on the list of system-level events and the timestamp of each event; and determining one or more system-level events associated with one or more impacted components as root causes of the multiple drive failures based on the multi-dimension information.

The method uses information from multiple regions of the DAE and correlate the information using a predetermined algorithm to automatically identify one or more possible root causes of the multiple drive failures. Compared with solutions in the prior art, the embodiments descried herein are automatic, more efficient, and faster in identifying the root causes for the DAE-context issues.

In one embodiment, before the determining of the one or more root causes, the context issue detector determines a sudden increment in one of a background medium scanning (BMS) error count or a reallocated sector count in each of the list of impacted drives.

In one embodiment, the context issue detector generates a report listing the one or more root causes, each root cause associated with a probability indicating how likely that root cause is a real root cause.

In one embodiment, the list of impacted components can include one or more of LCC firmware that has been updated, or a DAE that has been moved, or a drive that has been added or removed.

In one embodiment, the one or more root causes include an impacted component with a DAE vibration, and a system-level event that cause an abnormal temperature on all the failed drives. The abnormal temperature may be caused by a bug in an upgraded firmware controlling the speed of the fans, and the DAE vibration may be caused by the mishandling of a field engineer in replacing a drive, causing vibrations to the drive, thus damaging the drive.

In one embodiment, the multi-dimension information includes storage topology information, drive monitoring information, and system-level event information.

In one embodiment, the data domain operating system executes a command to pack the multi-dimension information into a compressed file and send the compressed file to the context issue detector in response to the data domain operating system detecting one or more drive failures in the DAE.

The embodiments described above are not exhaustive of all aspects of the present invention. It is contemplated that the invention includes all embodiments that can be practiced from all suitable combinations of the various embodiments summarized above, and also those disclosed below.

Figure 1:
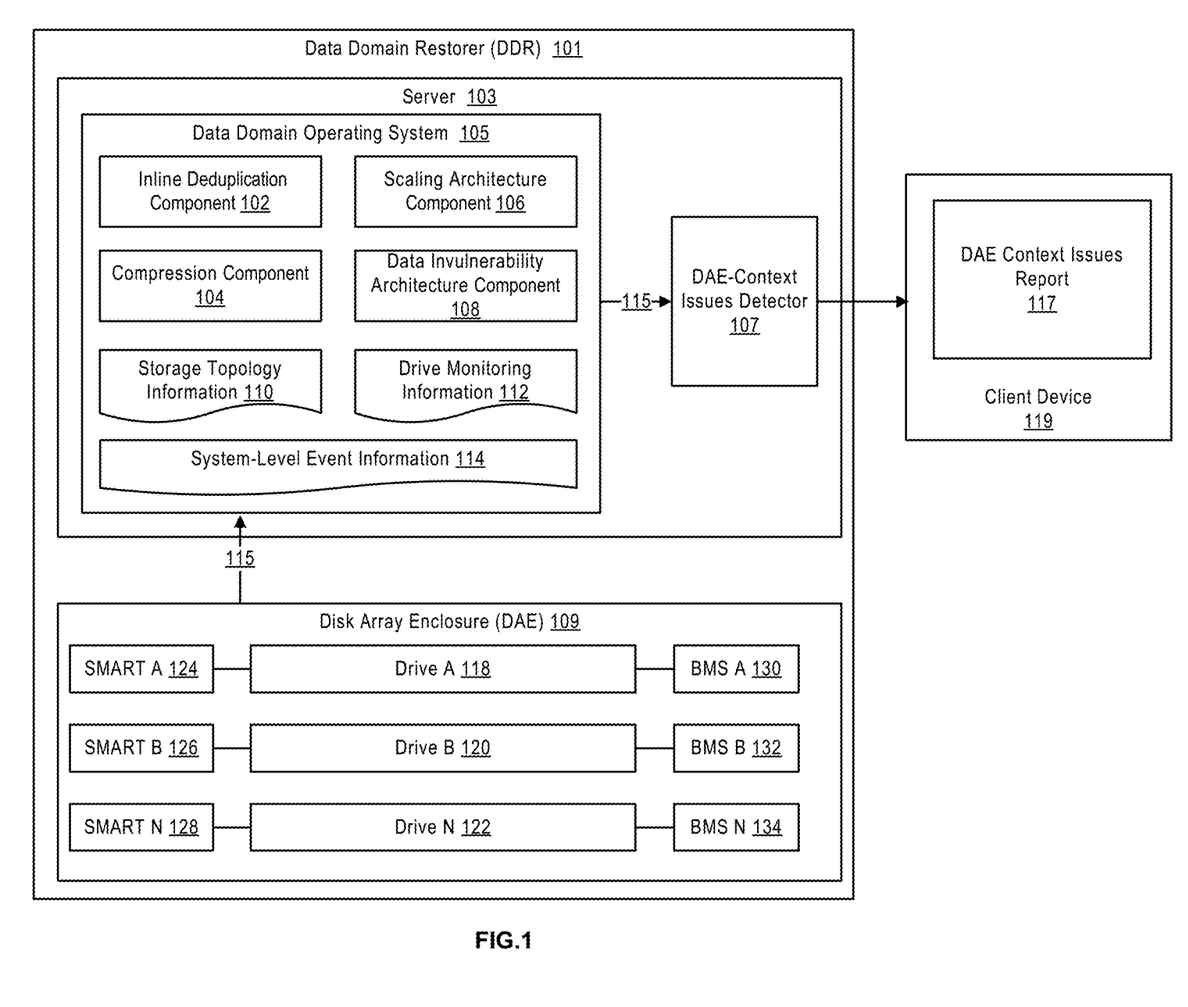
FIG. 1 is a block diagram illustrating an environment for various embodiments of the disclosure according to one embodiment.

FIG. 1 is a block diagram illustrating an environment for various embodiments of the disclosure according to one embodiment.

As shown in FIG. 1, a DAE-context issues detector 107, which can run on a server 103 in a data domain restorer (DDR) 101, can receive 115 multi-dimension information via a custom interface from a data domain operating system 105, and use the information to generate a report 117 for display on a client device 119. In one embodiment, the DAE-context issues detector 107 can also run on a server or a computer that is not part of the DDR 101.

For example, the multi-dimension information can be retrieved from the data domain operating system 105 via the custom interface to be analyzed offline in any computer or server that can run the DAE-context issues detector 107.

In one embodiment, the DDR 101 can be used for disk backup, archiving, disaster recovery, and online storage. The DDR 101 can connect to a network via Ethernet or Fibre Channel connections, and can use Serial Advanced Technology Attachment (SATA) disk drives and implement a redundant array of independent disks (RAID) in the software.

The DDR 101 can include one or more DAEs, each of which is a highly available, high-performance, high-capacity, disk-array storage system that uses a Fiber Channel Arbitrated Loop (FC-AL) as its interconnect interface. The modular, scalable design of each DAE provides additional disk storage based on needs of an organization.

FIG. 1 shows a single DAE 109 for the purpose of illustration. In actual implementations of the DDR 101, multiple similar DAEs can be included in the DDR 101, each of which is similar to the DAE 109 as described in detail below.

As shown, the DAE 109 can include multiple drives 118-122, each of which can be a computer hard disk drives (HDD), a solid-state drives (SSD), or an embedded multimedia card (MMC) drive. Further, each of the drive 118-122 can be associated with a self-monitoring, analysis and reporting technology (SMART) system, and a background medium scanning logic. For example, the SMART systems 124-128 and the BMS logics 130-134 are associated with the drives 118-120. In one embodiment, each SMART system and BMS logic can be included inside one of the drives 118-122.

Each of the SMART systems 124-128 can monitor the health state of its corresponding drive by keeping track of a series of variables, which are indicators of the reliability of the drive. Examples of the variables include a raw read error rate, a spin-up time, a start/stop count, a reallocated sector (RAS0 count, a seek error rate, a spin retry account, a power-on count, a reported uncorrectable error count, and a load cycle count.

Each BMS logic is a self-checking logic within the firmware internal of a drive. During idle times, the drive firmware can scan (i.e. read) the whole drive, record a small computer system interface (SCSI) sense key/sense data, and increase a corresponding error count in the event of a medium error. Thus, an increment in either BMS runtime errors or recovered errors means that the associated drive is experiencing medium degradation.

In one embodiment, the SMART systems 124-128 and the BMS logic 130-134 can generate drive monitoring information 112, which is part of the multi-dimension information used by the DAE-context issues detector 107 to generate the DAE context report 117. The rest of the multi-dimension information include storage topology information 110, and system-level event information 114, which will be discussed in detailed in FIG. 3.

In one embodiment, the data domain operating system 105 can include a number of software components, including an inline deduplication component 102, a compression component 104, a scaling architecture component 106, and a data invulnerability architecture component 108.

The inline deduplication component 102 can perform the following process for inline deduplication: analyzing inbound segments in RAM; if a segment is redundant, creating a reference to the stored segment; if a segment is unique, compressing and storing the segment. Inline deduplication requires less disk space than post-process deduplication, less administration, and reduces disk seek time to determine whether the new data must be stored.

In one embodiment, the compression component 104 can perform global compression, local compression, and deduplication. Global compression equals deduplication, and identifies previously stored segments and cannot be turned off. Local compression compresses segments using common, industry standard algorithms (for example, lz, gz, and gzfast) before writing the segments to one of the drives 118-122.

In one embodiment, the scaling architecture 106 can speed up the DDR 101 by performing a variety of operations. For example, the scaling architecture 106 can break data into variable-length segments, and provide a fingerprint or hash to each segment for identification. Further, the scaling architecture 106 can identify duplicate segments in RAM and/or inline before storing them to one of the drives 118-122. If a segment is a duplicate, the segment is referenced and discarded. If a segment is new, the new segment is grouped with other new segments, and the grouped new segments are then compressed. The scaling architecture 106 can write data (i.e., segments, fingerprints, metadata, and logs) to containers, which are then written to one of the drives 118-122.

In one embodiment, the data invulnerability architecture component 108 can perform end-to-end verification, which comprises the following operations: receiving a write request from a backup software, analyzing data for redundancy and storing new data segments, storing fingerprints, and so on. The data invulnerability architecture component 108 can also perform fault avoidance and containment using a specialized log-structured file system equipped with the DDR 101. The log-structured file system has fewer complex data structures, and includes a non-volatile RAM for fast and safe start.

Further, the data invulnerability architecture component 108 can perform continuous fault detection and healing, which provides an extra level of protection within the data domain operation system 105. The data domain operating system 105 can detect faults and recover from them continuously to ensure successful data restore operations.

In one embodiment, the continuous and healing process can include the following operations performed by the data domain operating system 105. The first operation is that the data domain operating system 105 periodically checks the integrity of stripes in a redundant array of independent disks (RAID) and container logs. In this disclosure, each of the drives 118-122 can be a RAID. The second operation is that the data domain operating system 105 use features of the RAID system to heal faults. The data domain operating system 105 then re-verifies data integrity during each read, and heal any errors when they are encountered.

The data invulnerability architecture component 108 can perform file system recovery to reconstruct lost or corrupted file system metadata. In the DDR file system, data is written in a self-describing format, which allows the file system to be recreated by scanning logs and rebuilding the file system from metadata stored with the data.

Figure 2A:
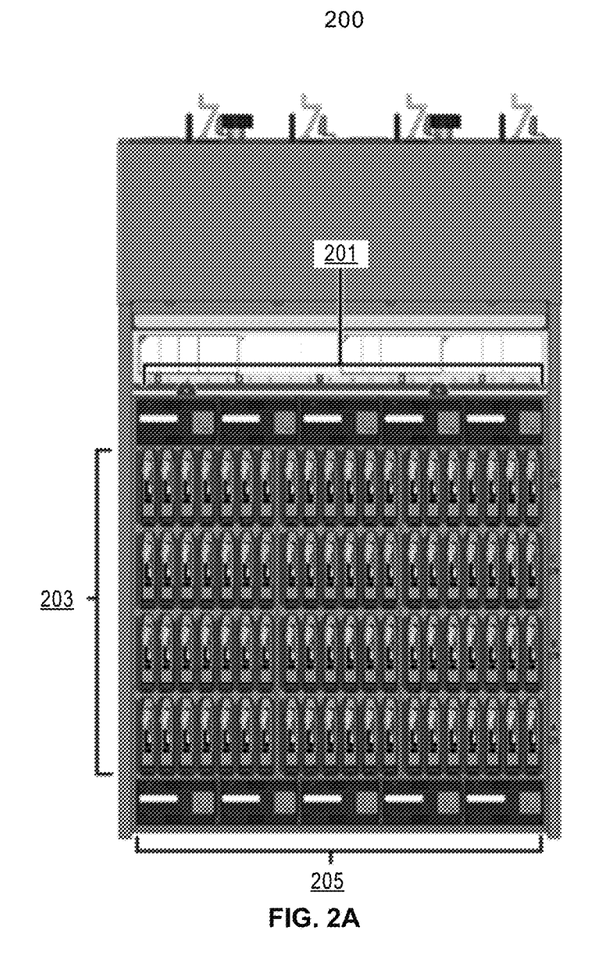
FIGS. 2A-2C illustrate a DAE according to one embodiment.
Figure 2B:
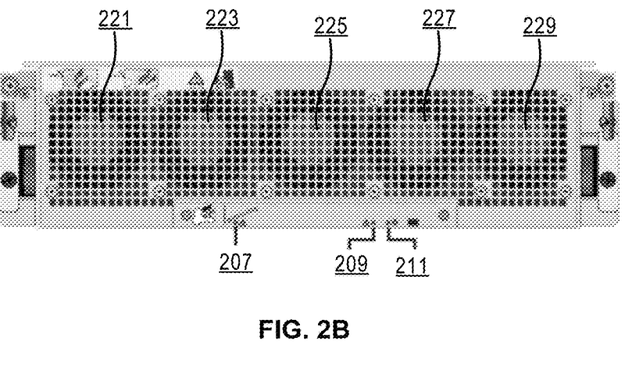
Figure 2C:
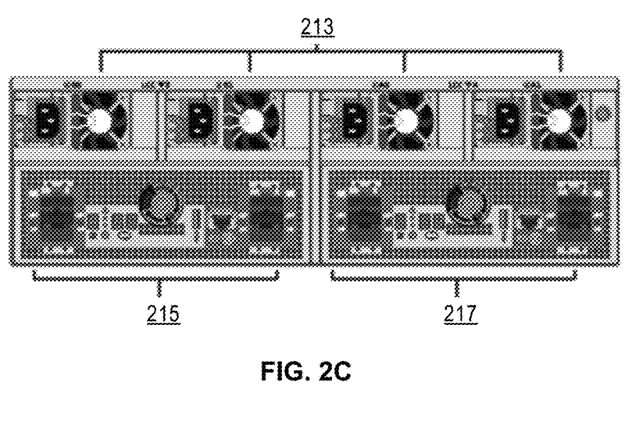

FIGS. 2A-2C illustrate a DAE 200 according to one embodiment. The DAE shown in FIGS. 2A-2C can is an example of the DAE 109 in FIG. 1. FIG. 2A is a top view of the DAE 200, FIG. 2B is a front view of the DAE 200, and FIG. 2C is a rear view of the DAE 200.

As shown in FIG. 2A, the DAE 200 is populated with 80 drives 203 and 10 redundant cooling modules (fans), with 5 of them 205 in the front and 5 of them 201 at the rear. The DAE 200 can also include multiple hot-swappable drives; a drive carrier for each drive; two link control cards (LCCs); and four power supplies module.

In one embodiment, each disk drive consists of one disk in a disk carrier. A disk drive can be added or removed while the DAE 200 is powered up. However, special care should be exercised in removing disk drives while they are in use, since disk drives are extremely sensitive electronic components. Otherwise, disk vibrations caused by the lack of special care can cause damages to the disk in the drive.

The disk drive carriers are metal and plastic assemblies that provide smooth, reliable contact with the enclosure slot guides and midplane connectors. Each carrier has a handle with a latch and spring clips. The latch holds the disk drive in place to ensure proper connection with the midplane. Disk drive activity/fault LEDs are integrated into the carrier.

In one embodiment, the LCCs support, control, and monitor the DAE, and is the primary interconnect management element. Each LCC includes connectors for input and output to downstream devices. The LCCs in the DAE 200 connect to storage processors and other DAEs. The cables connect the LCCs in the DAE 200 in a daisy chain topology. Internally, each DAE LCC uses protocols to emulate a loop, and connects to the drives in the DAE 200 in a point-to-point fashion through a switch. Each LCC can independently receive and electrically terminates incoming signals. For traffic from the DAE's storage processors, the LCC switch passes the signal from the input port to the drive being accessed; the switch then forwards the drive output signal to the port. Each LCC can independently monitor the environmental status of the entire enclosure, using a microcomputer-controlled monitor program. The monitor communicates the status to one or more of the storage processors, which poll the status of the DAE 200. Each LCC includes connectors for input and expansion to downstream devices. An enclosure address (EA) indicator and bus (loop) identification indicator is located on the LCCs of the DAE 200.

In one embodiment, the power supply modules and the cooling modules (fans) are separated. The power supply modules are located on the rear, and each can have a knob used for removing and installing the power supply module from the DAE. As discussed above, the cooling modules or fans are located on the front and rear of the DAE 200.

In the DAE 200, disk drive slots and the cooling modules are located inside the enclosure. To access the disk drives, the enclosure can be released and pulled out of the cabinet. The enclosure can slide out of the cabinet far enough for a field engineer to access its internal components, and then can lock on the rails in the service position so that the field engineer cannot pull it out any farther.

In FIG. 2B, which is a front view of the DAE 200, several light-emitting diodes (LEDs) can be used to indicate a DAE status. For example, a LED 207 can indicate a fault within the system status card when the LED 207 is on, and no fault when the LED 207 is off. A LED 209 can indicate that a component within the DAE 200 (e.g., disk, fan, LCC, power supply) has faulted when the LED 209 is on, and that the component has no fault when the LED 209 is off. A LED 211 indicates that the DAE 200 is powered on and has no fault when the LED 211 is on, and that the DAE 200 is powered off when the LED 211 is off. FIG. 2B also shows there are 5 cooling modules (fans) 221-229 at the front of the DAE 200.

FIG. 2C shows that the rear components of the DAE 200 are redundantly distributed across two sides, A and B. When viewed from behind, the right half of the DAE 200 makes up the A-side of the DAE 200, and the left half of the DAE 200 makes up the B-side. FIG. 2C shows the two LCCs 215 and 217, and the four power supplies 213. The four fans are not part of the 10 cooling modules mentioned above as those cooling modules are not visible at the rear of the DAE 200.

Figure 3:
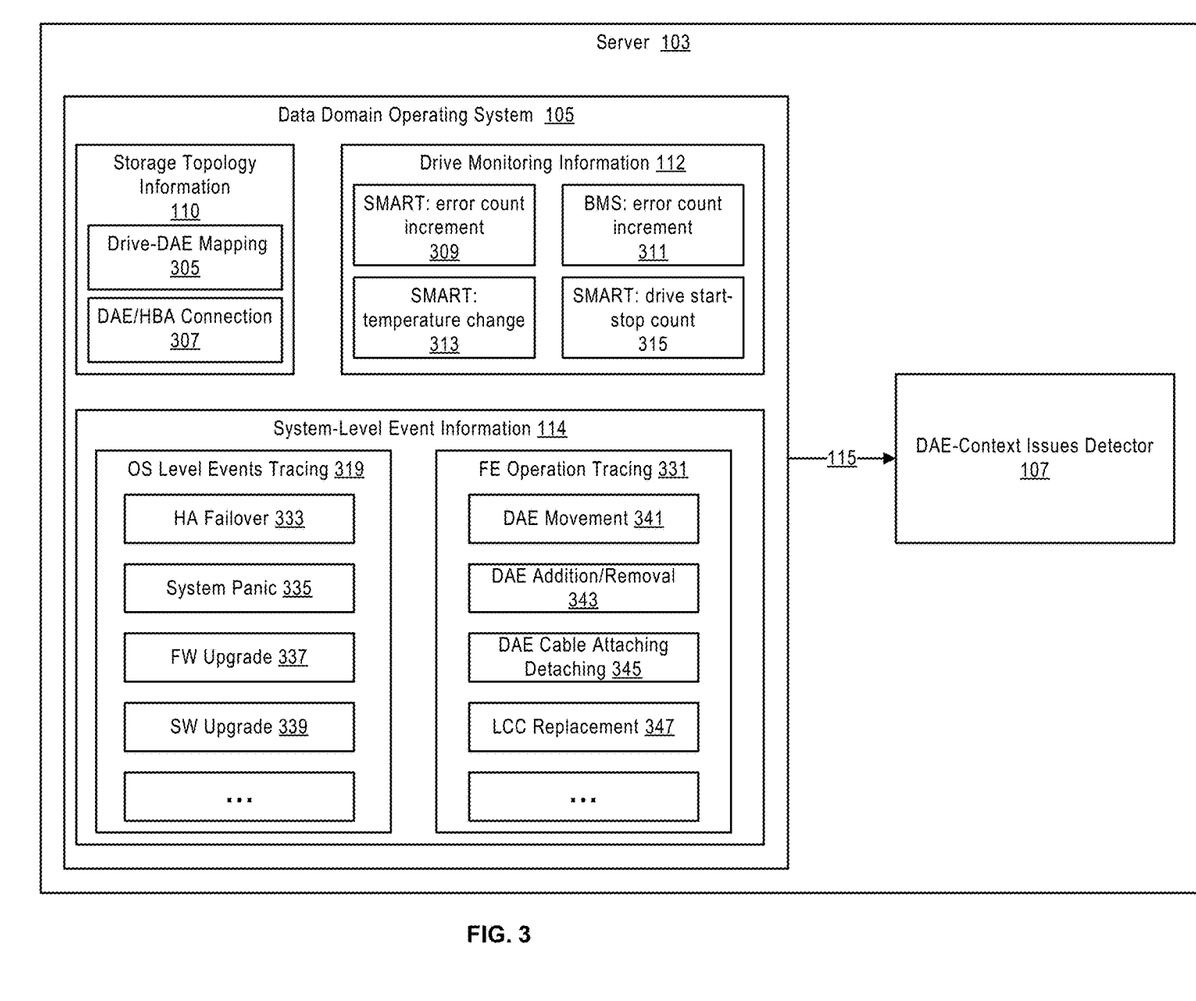
FIG. 3 illustrates a system for identifying DAE-context issues through multi-dimension information correlation according to one embodiment.

FIG. 3 illustrates a system for identifying DAE-context issues through multi-dimension information correlation according to one embodiment. The system shown in FIG. 3 is designed to provide an improved solution to DAE-context issues, which can occur in the following two example scenarios.

In the first example scenario, an organization has a DDR with multiple DAEs attached and the system works well until a system upgrade, after which multiple drives failure from different DAEs are found. The field engineer first checked all failed drives' SMART, and determined that all the failed drives had a sudden increase in the Reallocated Sector (RAS) count. The RAS count indicates remapped IO numbers when a write request fails and the drive firmware locates a new sector for the write operation as the replacement of the existing problematic sector. Thus, the RAS increment means the drive has worn out. However, when multiple drives experience such a sudden increment in RAS counts around the same time, the quality of the drive may not be the root cause. In the meanwhile, the drive temperature of the drive experienced a significant increase (e.g., from 36 to 40 degree) as indicated by the corresponding SMART system of the drive after the upgrade. Further, the upgrade log indicates that the LCCs of the DAE have also been upgraded. Thus, the multiple drive failures are likely to be caused by the upgrade of the firmware in the LCCs. In this example scenario, the upgraded firmware of the LCCs, which is designed to lower the speed of the fans adaptively for power saving based on the loads of the DAE, did not work as expected due to a defect in the firmware of the LCCs. The lower fan speed caused the higher temperature in the DAE, which has caused the drives to fail.

In the second example scenario, an organization has a DDR with multiple DAEs attached and the system works well until an LCC is replaced in one of the DAEs of the DDR. After the LCC replacement, multiple drives failed on the DAE, and the SMART/BMS data on all the failed drives indicates a sudden increase in medium errors (e.g., from 0 to 500 errors within one day), and in recovered error counts in BMS log pages.

As descried above in FIG. 1, a BMS is a self-checking logic within the firmware of each drive, and can scan the whole drive during idle times. The BMS can record the SCSI sense key/sense data and increase the corresponding count in medium errors. Thus, the sudden increases in either the BMS medium error count and the recovered error count mean that the drive is experiencing a medium degradation. However, when multiple drives from the same DAE all experience a medium degradation around the same time, the quality of the drives may not be the root cause. Here, in contrast to the first example scenario, the SMART data does not indicate an abnormal temperature increase in the drive.

In the second drive scenario, drive vibrations during IO service are the root cause of the drive degradation because the field engineer did not perform the LCC replacement properly. For example, the field engineer may have moved the drive shelf while the DDR is still running and while the R/W IOs are ongoing. This mishandling of the DDR may cause vibrations in the drive, which tend to wear out the drive.

To address the issues encountered in the two example scenarios descried above, the system described in FIG. 3 provides an efficient solution that can reliably detect the root cause of the multiple drive failures automatically and without human invention by correlation information collected from different regions of the DDR 101.

In one embodiment, when an indication that multiple drive failed in the DDR 101, the system can automatically send multi-dimension information from the data domain operating system 105 to the DAE-context issues detector 107, which can perform correlation among the information from different areas/dimensions of the DDR 101.

In one embodiment, when detecting the multiple drive failures, the data domain operating system 105 can execute a command to retrieve the multi-dimension information, compress the information, and send the compressed information to the DAE-context detector 107.

In one embodiment, as used herein, the multi-dimension information is information collected from different regions of the DDR 101, and thus, a dimension is a region or area. As shown in FIG. 3, the multi-dimension information can include the storage topology information 110, the drive monitoring information 112, and the system-level event information 114.

In one embodiment, the storage topology information 110 specifies a topology of the DAEs in the DDR 101, which can include an identifier of each DAE, and an identifier of each drive in each DAE of the DDR 101. The storage topology information 110 can also specify how the drives within a DAE of the DDR 101 relate to each other, and how the DAEs within the DDR relate to each other. As shown, the storage topology information 110 can include drive-DAE mapping information 305 and DAE/HBA connection information 307. A DAE/HBA connection is a connection between a DAE and a host bus adapter. Thus, the storage topology information 110 can identity which DAE or which drive in a DAE is the one that has worn out and needs to be replaced.

In one embodiment, the drive monitoring information 112 can include an error count increment 309 as recorded by the corresponding SMART of a drive, an error count increment 211 as recorded by the corresponding BMS of the drive, a temperature change 313 as recorded by the corresponding SMART, and a drive start-stop count 315 as recorded by the corresponding SMAT. The information as recorded by the corresponding SMART and BMS of a drive can indicate the health state of the drive.

In one embodiment, the system-level event information 114 can include operating system (OS)-level events tracing data 319, and field engineer (FE) operating tracing data 331.

The OS-level events tracing data 319 can further include high availability (HA) failover events 333, and information about system panic 335. In one embodiment, the DDR 101 system may crash if its kernel encounters an illegal condition from which it cannot recover; in such a case, the DDR 101 will "panic" and save its memory contents to the dump device before it stops running or crashes.

As further shown, the OS-level events tracing data 319 can further include firmware upgrade information 337, which can be log information indicating when the firmware of a particular drive was updated or upgraded; and software upgrade information 339, which can be log information indicating when any of the software component in the operating data domain operating system 105 was upgraded or updated.

In one embodiment, the FE operation tracing data 331 include information about DAE movement 241, information about the DAE addition and/or removal 341, information about DAE cable attaching and/or detaching 345, and information about LCC replacement 347. The FE operation information records what a field engineer has done to the DDR 101 to perform system upgrade or fix issues.

The DAE-context issues detector 107, upon receiving 115 the multi-dimension information, can unpack the compressed multi-dimension information, and perform a predetermined algorithm to determine the root causes of the multiple drive failures.

Figure 4:
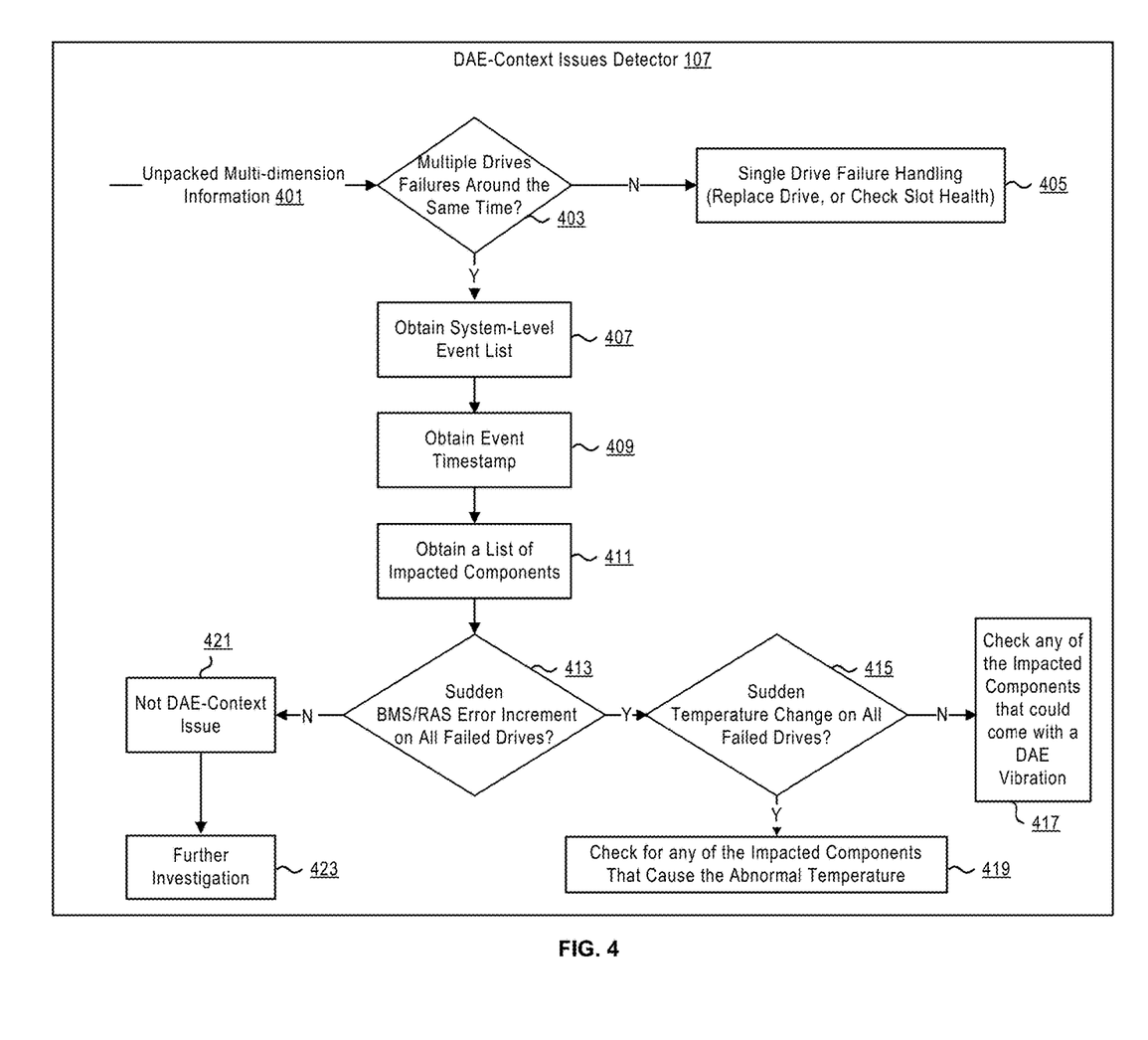
FIG. 4 illustrates a process of identifying DAE-context issues through multi-dimension information correlation according to one embodiment.

FIG. 4 illustrates a process of identifying DAE-context issues through multi-dimension information correlation according to one embodiment. In this process, any drive failure due to connection issue is not considered since connection-related issues can be easier to identify based on the topology information and since connection-related issues are not the DAE-context issues as defined in this disclosure.

As shown in FIG. 4, upon unpacking the multi-dimension information in operation 401, the DAE-context issues detector 107 checks whether multiple drives failed around the same time in operation 401.

In operation 405, if only one drive failed, the DAE-context issues detector 107 can output a message that the issue is not a DAE-context issue, and needs to be handled differently, for example, replacing the drive, or checking the health of the drive slot.

In operations 407-411, the DAE-context issues detector 107 extracts a system-level event list from the multi-dimension information 401, and a timestamp for each system-level event. Based on the system-level event list and the timestamp of each event in the system-level event list, the DAE-context issues detector 107 can determine the list of components impacted by the system-level event list based on the timestamp of each event. The impacted components can be LCC firmware that has been updated, or a DAE that has been moved, or a drive that has been added or removed.

In operation 413, the DAE-context issues detector 107 checks whether there are sudden error increments on all failed drives. In one embodiment, the term "sudden" can be defined as exceeding a predetermined threshold within one day, for example, an increment of 200 in one day. If the threshold is not exceeded, then the multiple drive failures is not a DAE-context issue, and the process can exit as shown in operations 421 and 423. Otherwise, if the threshold is exceeded, then the DAE-context issues detector 107 determines that the multiple drive failures are a DAE-context issue, and further checks if a threshold of temperature increase (e.g., 30 degrees within one day) is exceeded in operation 415.

In operation 417, if the temperature threshold is not exceeded, the DAE-context issues detector 107 would recommend checking for the existence of any DAE vibration issue on any of the list of impacted components based on the multi-dimension information. Otherwise, as shown in operation 419, the DAE-context issues detector 107 would recommend checking any of the impacted components that could have caused the abnormal temperature.

In one embodiment, the report can list multiple root causes, with each having a probability number. The higher the probability number, the more likely that the associated recommended root cause is the real root cause, and vice versa.

Figure 5:
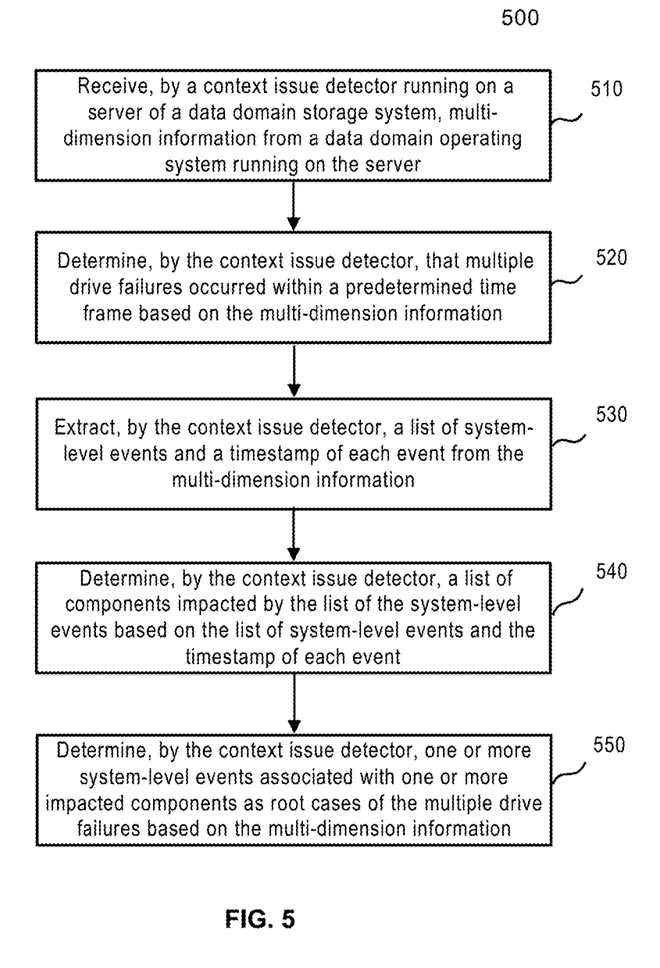
FIG. 5 is a flow diagram illustrating another process of identifying DAE-context issues through multi-dimension information correlation according to one embodiment.

FIG. 5 is a flow diagram illustrating another process 500 of identifying DAE-context issues through multi-dimension information correlation according to one embodiment. Process 500 may be performed by processing logic that includes hardware (e.g. circuitry, dedicated logic, etc.), software (e.g., embodied on a non-transitory computer readable medium), or a combination thereof. For example, process 500 may be performed by processor(s) 1501 of FIG. 6.

Referring to FIG. 5, in operation 510, the processing logic receives multi-dimension information from a data domain operating system running on the server. In operation 520, the processing logic determines that multiple drive failures occurred within a predetermined time frame based on the multi-dimension information. In operation 530, the processing logic extracts a list of system-level events and a timestamp of each event from the multi-dimension information. In operation 540, the processing logic determines a list of components impacted by the list of the system-level events based on the list of system-level events and the timestamp of each event. In operation 550, the processing logic determines one or more system-level events associated with one or more impacted components as root cases of the multiple drive failures based on the multi-dimension information.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
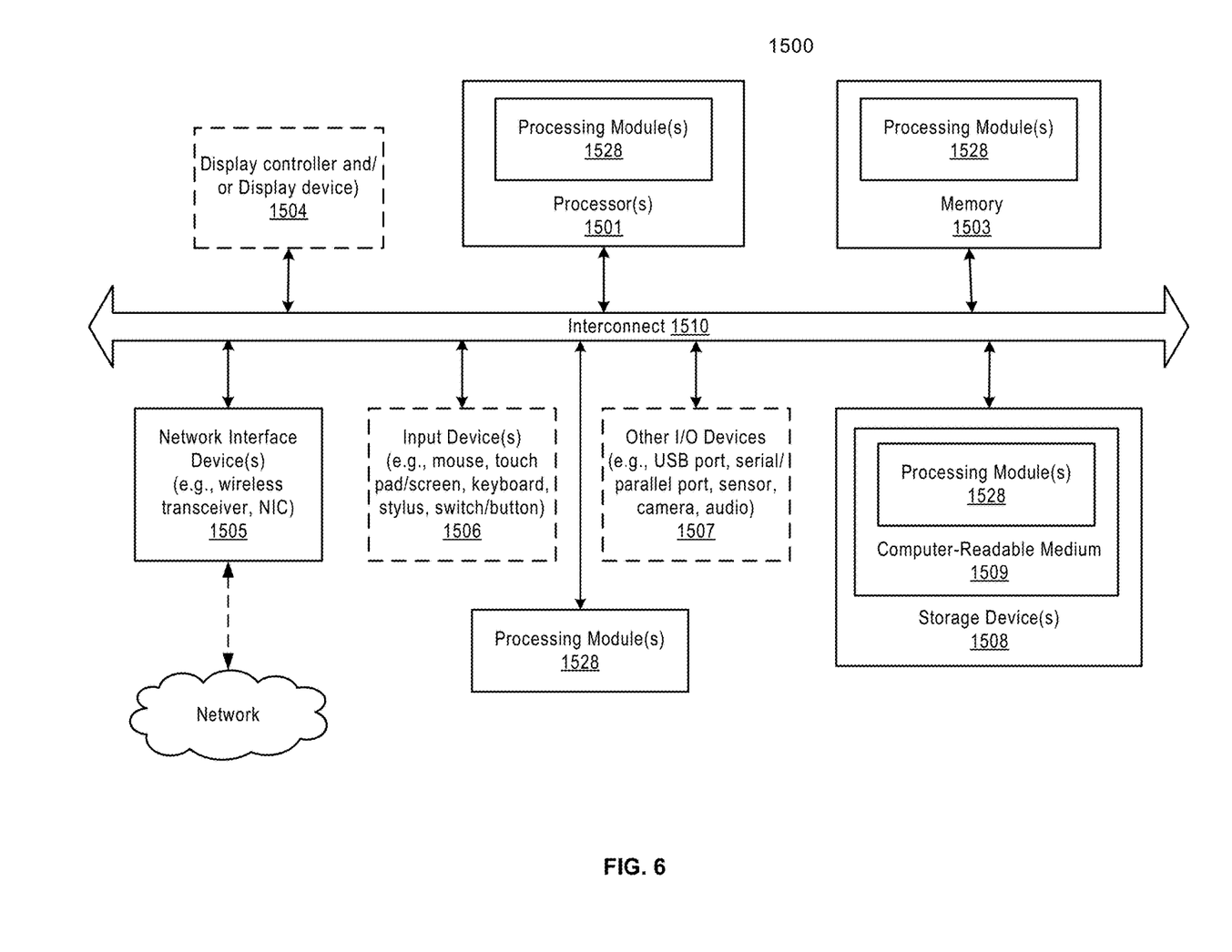
FIG. 6 is a block diagram illustrating an example of a data processing system which may be used with one embodiment.

FIG. 6 is a block diagram illustrating an example of a data processing system 1500 which may be used with one embodiment of the invention. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, a FaaS module, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of automatically identifying context issues in a disk array enclosure (DAE) of a data domain storage system, comprising:
   detecting, by the data domain storage system, that multiple drive failures in the DAE;
   in response to the detecting of the multiple drive failures, packing multi-dimension information from a data domain operating system running on a server of the data domain storage system into a compressed file, and sending the compressed file to a context issue detector running on the server of the data domain storage system;
   unpacking by the context issue detector, the multi-dimension information;
   determining, by the context issue detector, that multiple drive failures occurred within a predetermined time frame based on the multi-dimension information;
   extracting, by the context issue detector, a list of system-level events and a timestamp of each event from the multi-dimension information;
   determining, by the context issue detector, a list of components impacted by the list of system-level events based on the list of system-level events and the timestamp of each event; and
   determining, by the context issue detector, one or more system-level events associated with one or more impacted components as one or more root causes of the multiple drive failures based on the multi-dimension information.

2. The computer-implemented method of claim 1, further comprising:
   before the determining of the one or more root causes, determining, by the context issue detector, a sudden increment in one of a background medium scanning (BMS) error count or a reallocated sector count in each of the list of impacted drives.

3. The computer-implemented method of claim 1, further comprising:
   generating, by the context issue detector, a report listing the one or more root causes, each root cause associated with a probability indicating how likely that root cause is a real root cause.

4. The computer-implemented method of claim 1, wherein the list of impacted components include one or more of LCC firmware that has been updated, a DAE that has been moved, or a drive that has been added or removed.

5. The computer-implemented method of claim 1, wherein the one or more root causes include an impacted component with a DAE vibration, and a system-level event that cause an abnormal temperature on all failed drives.

6. The computer-implemented method of claim 1, wherein the multi-dimension information includes storage topology information, drive monitoring information, and system-level event information.

7. A non-transitory machine-readable medium having instructions stored therein, which when executed by a processor a data domain storage system, cause the data domain storage system to perform operations comprising:
   detecting that multiple drive failures in a disk array enclosure (DAE) of the data domain storage system;
   in response to the detecting of the multiple drive failures, packing multi-dimension information from a data domain operating system running on a server of the data domain storage system into a compressed file, and sending the compressed file to a context issue detector running on the server of the data domain storage system;
   unpacking the multi-dimension information;
   determining that multiple drive failures occurred within a predetermined time frame based on the multi-dimension information;
   extracting a list of system-level events and a timestamp of each event from the multi-dimension information;
   determining a list of components impacted by the list of system-level events based on the list of system-level events and the timestamp of each event; and
   determining one or more system-level events associated with one or more impacted components as one or more root causes of the multiple drive failures based on the multi-dimension information.

8. The non-transitory machine-readable medium of claim 7, the operations further comprising:
   before the determining of the one or more root causes, determining a sudden increment in one of a background medium scanning (BMS) error count or a reallocated sector count in each of the list of impacted drives.

9. The non-transitory machine-readable medium of claim 7, the operations further comprising:
   generating a report listing the one or more root causes, each root cause associated with a probability indicating how likely that root cause is a real root cause.

10. The non-transitory machine-readable medium of claim 7, wherein the list of impacted components include one or more of LCC firmware that has been updated, or a DAE that has been moved, or a drive that has been added or removed.

11. The non-transitory machine-readable medium of claim 7, wherein the one or more root causes include an impacted component with a DAE vibration, and a system-level event that cause an abnormal temperature on all failed drives.

12. The non-transitory machine-readable medium of claim 7, wherein the multi-dimension information includes storage topology information, drive monitoring information, and system-level event information.

13. A data domain storage system, comprising:
a disk array enclosure (DAE);
a processor; and
a memory coupled to the processor to store instructions, which when executed by the processor, cause the data domain storage system to perform operations of automatically identifying context issues in the DAE, the operations comprising:
detecting that multiple drive failures in the DAE;
in response to the detecting of the multiple drive failures, packing multi-dimension information from a data domain operating system running on a server of the data domain storage system into a compressed file, and sending the compressed file to a context issue detector running on the server of the data domain storage system;
unpacking the multi-dimension information;
determining multiple drive failures occurred within a predetermined time frame based on the multi-dimension information;
extracting a list of system-level events and a timestamp of each event from the multi-dimension information;
determining a list of components impacted by the list of system-level events based on the list of system-level events and the timestamp of each event; and
determining one or more system-level events associated with one or more impacted components as one or more root cases of the multiple drive failures based on the multi-dimension information.

14. The data processing system of claim 13, the operations further comprising:
before the determining of the one or more root causes, determining a sudden increment in one of a background medium scanning (BMS) error count or a reallocated sector count in each of the list of impacted drives.

15. The data processing system of claim 13, the operations further comprising:
generating a report listing the one or more root causes, each root cause associated with a probability indicating how likely that root cause is a real root cause.

16. The data processing system of claim 13, wherein the list of impacted components include one or more of LCC firmware that has been updated, or a DAE that has been moved, or a drive that has been added or removed.

17. The data processing system of claim 13, wherein the one or more root causes include an impacted component with a DAE vibration, and a system-level event that cause an abnormal temperature on all failed drives.

18. The data processing system of claim 13, wherein the multi-dimension information includes storage topology information, drive monitoring information, and system-level event information.

* * * * *